Feb. 28, 1939.  R. E. FISHER  2,148,932
HOIST
Filed Feb. 2, 1938    2 Sheets-Sheet 1
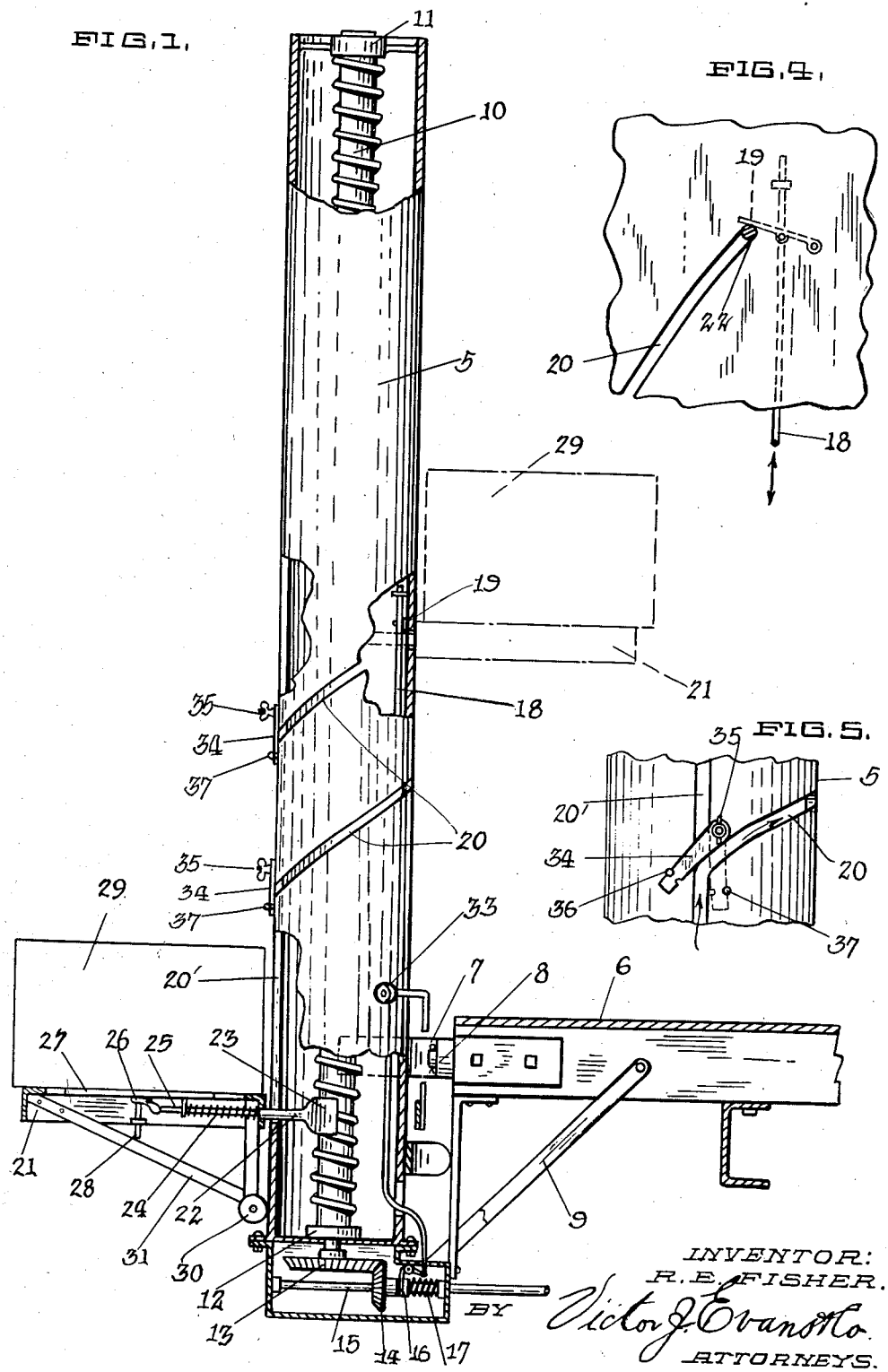
INVENTOR:
R. E. FISHER.
BY Victor J. Evans & Co.
ATTORNEYS.

Feb. 28, 1939.　　　　R. E. FISHER　　　　2,148,932
HOIST
Filed Feb. 2, 1938　　　　2 Sheets-Sheet 2
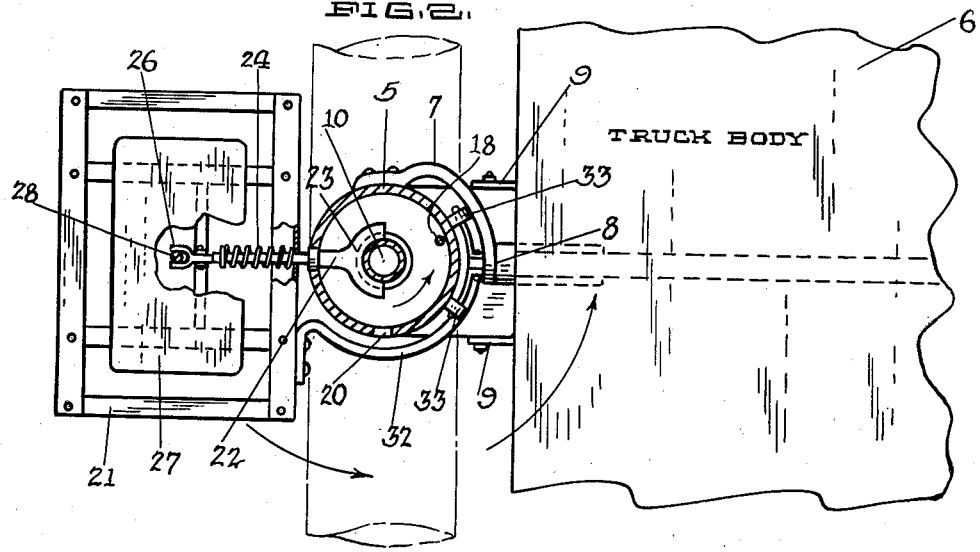
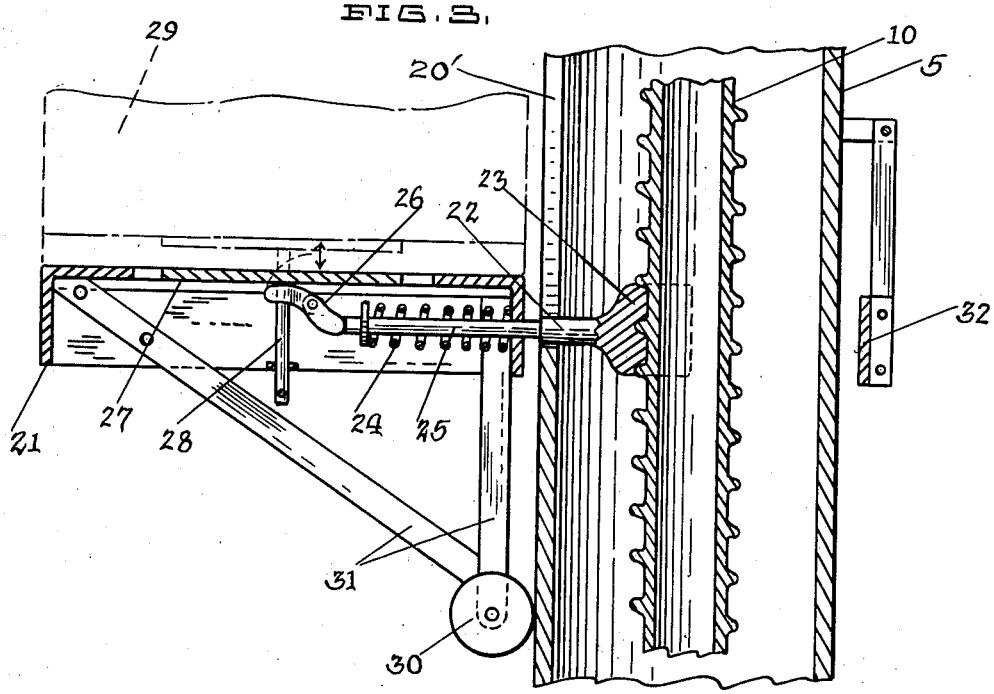
INVENTOR:
R. E. FISHER.
BY Victor J. Evans & Co.
ATTORNEYS.

Patented Feb. 28, 1939

2,148,932

UNITED STATES PATENT OFFICE 2,148,932

HOIST

Robert E. Fisher, Woodland, Calif.

Application February 2, 1938, Serial No. 188,388

2 Claims. (Cl. 187—24)

This invention relates to improvements in hoists and has particular reference to a hoist capable of being attached to the rear end of a vehicle, such as a truck, and which embodies means for raising a package or the like from a position above the ground or floor upwardly and inwardly over the truck or vehicle body, so that the loader of the truck may readily grasp the package and remove the same.

The principal object of the invention is to provide an improved hoist which may be attached to any vehicle body, and which includes a platform upon which packages or the like may be placed, which platform is movable upwardly upon the column by means of a driven screw and is rotated inwardly by means of spiral grooves formed in the hoist column.

Another object of the invention is to provide a device of this character which is practically automatic in its operation and which will raise a load to the desired position when the same is placed upon the elevating platform.

A further object is to provide a hoist of this character that is comparatively simple in construction, and one which may be moved to a horizontal position behind the end of the truck body when not in use.

Other objects and advantages will be apparent during the course of the following description.

In the accompanying drawings forming a part of this specification and in which like numerals are employed to designate like parts throughout the same, Fig. 1 is a side elevation, partly in section, showing the hoisting column arranged upon the end of a truck body;

Fig. 2 is a plan section, showing the truck body, and the hoisting column and platform of the device;

Fig. 3 is a greatly enlarged sectional detailed view of the column, the screw means for raising the platform, and means for automatically connecting the platform to the screw when it is desired to elevate the same; and Fig. 4 is a fragmentary detail view, showing the means for automatically tripping the driving mechanism when the platform has been placed in the desired position; and Fig. 5 is a detail view of a portion of the hoisting column, the vertical slot in said column and showing one of the spiral slots communicating therewith, also a switch mechanism for selecting the desired spiral slot.

In the accompanying drawings wherein for the purpose of illustration is shown a preferred embodiment of my invention, and referring particularly to Fig. 1, the device consists of a hollow column 5 attached to the body of the truck 6 by means of a bracket 7, which is pivoted at the point 8. Braces 9 also extend from the truck body and are secured to the lower end of the column, as indicated in Fig. 1. These braces 9 may be removed when it is desired to swing the column to a horizontal position when not in use, as indicated in Fig. 2. The column is additionally provided with a screw member 10 mounted in bearings 11 and 12 and extending through the column, said screw member being driven by a gear 13 and a pinion 14 mounted on a shaft 15. The shaft 15 may be driven in any suitable manner from the engine of the truck. The pinion 14 is provided with a clutch member 16, which clutch member normally holds the pinion 14 in engagement with the gear 13 by means of a spring 17 mounted upon the shaft 15. This clutch mechanism is connected by means of a rod 18 which extends upwardly in the column to a trigger 19, as clearly disclosed in Fig. 4.

The column is provided with a plurality of spiral slots 20, which slots communicate with the vertical slot 20' formed in the rear side of the column and extending from a position at the rear of the column upwardly to a position in the front section of the column, as indicated in Fig. 1. A platform 21 is positioned upon an arm 22, having a nut section 23 formed on its inner end, which nut section is clearly shown in Fig. 2 and normally engages the screw due to the action of a spring 24 mounted upon a spindle 25 extending through the platform and capable of engaging a pivoted dog 26, mounted on the underside of the platform. An operating plate 27 is carried by an upright spindle 28 and normally extends slightly above said platform, as shown in dotted lines in Fig. 3.

It will thus be observed that when a package or other article 29 is placed upon the platform, and assuming that the shaft 15 is operating the pinion 14 and the gear 13 which constantly rotates the screw 10, the nut will engage the screw 10 and cause the entire platform to be raised upwardly in one of the spiral slots 20 formed in the column, that is, the arm 22 will follow in the vertical slot 20' and with the selected spiral slot 20 upwardly and inwardly to a position over the truck body, so that the operator may readily remove the package. Upon the removal of said package, the operating plate 27 will be again moved to normal position, and the platform will immediately gravitate back to its original position, as the nut member 23 is then released from the screw 10 by the action of spring 24.

The platform is supported against the column by means of rollers 30, carried by braces 31, and an arcuate support 32 extends around the column and carries at its upper end rollers 33, which ride upon the column to additionally support the platform.

Referring to Figs. 1 and 5 it will be noted that a selective switch mechanism including a pivoted pawl 34 is provided at the juncture of each spiral slot 20 with the vertical slot 20′ and said switches are held at their pivot points by means of wing nuts 35 and at their lower ends by stop pins 36 and 37 so that when these pawls are swung to the position shown in Fig. 5, a certain spiral slot 20 is selected and when swung to the dotted position the arm 22 will pass that particular spiral slot and pass to the next one selected, whereby the load may be carried to different heights to accommodate different truck bodies.

It will thus be seen that when any package is placed upon the actuating plate 27, the device becomes immediately operative, and the platform is raised from a position adjacent the ground or floor to an elevated position on the inside of the column where the package may be readily and quickly removed, thereby making the device substantially automotive in operation and enabling two operators to quickly load a truck.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention I claim:—

1. In a device of the class described embodying a hoist capable of being attached to a vehicle body, said hoist embodying a column having a screw mounted therein, a hoisting platform associated with said column, a vertical slot formed in said column, means carried by said platform and extending through said vertical slot and having a nut formed on its inner end, spiral slots communicating with said vertical slot, tripping means carried by said platform to cause said nut to engage the screw, tripping means associated with said nut for releasing the same when the screw has raised the platform to the desired position, and anti-friction means carried by said platform for engaging said column to support the same in a horizontal position as it is moved upwardly upon the column.

2. In a device of the class described embodying a hoist capable of being attached to a vehicle body, said hoist embodying a column having a screw mounted therein, a hoisting platform associated with said column, a vertical slot formed in said column, means carried by said platform and extending through said vertical slot and having a nut formed on its inner end, spiral slots communicating with said vertical slot, tripping means carried by said platform to cause said nut to engage the screw, tripping means associated with said nut for releasing the same when the screw has raised the platform to the desired position, anti-friction means carried by said platform for engaging said column to support the same in a horizontal position as it is moved upwardly upon the column, and switch means associated with said vertical slot and said spiral slots whereby one of said spiral slots may be selected to raise the platform and swing the same to a selected position in front of said column.

ROBERT E. FISHER.